US006096157A

United States Patent [19]

Imabeppu et al.

[11] Patent Number: 6,096,157

[45] Date of Patent: Aug. 1, 2000

[54] CAST COATED PAPER FOR INK JET RECORDING, PROCESS FOR PRODUCING THE PAPER AND INK JET RECORDING METHOD USING THE PAPER

[75] Inventors: Katsuyoshi Imabeppu, Itami; Shinichi Asano, Nishinomiya; Hiroyuki Ohashi, Neyagawa; Kazuhiro Nojima, Kobe; Eiichi Suzuki, Asaka; Mamoru Sakaki, Yamato, all of Japan

[73] Assignees: Canon Kabushiki Kaisha; Oji Paper Co., Ltd., both of Tokyo, Japan

[21] Appl. No.: 09/012,556

[22] Filed: Jan. 23, 1998

Related U.S. Application Data

[62] Division of application No. 08/545,154, Oct. 19, 1995, Pat. No. 5,741,584.

[30] Foreign Application Priority Data

Oct. 20, 1994 [JP] Japan .................................... 6-255757

[51] Int. Cl.[7] .................................................... B29C 65/00

[52] U.S. Cl. .......................... 156/285; 156/242; 156/278; 156/284; 156/295; 156/299; 427/369; 427/288; 427/402; 427/428; 427/370

[58] Field of Search .................................... 427/261, 334, 427/161, 362, 256, 288, 146, 361, 369, 370, 372.2, 402, 428; 156/242, 278, 284, 285, 295, 299, 306.3

[56] References Cited

U.S. PATENT DOCUMENTS

| | | | |
|---|---|---|---|
| 4,686,118 | 8/1987 | Arai et al. | 427/261 |
| 4,758,461 | 7/1988 | Akiya et al. | 428/212 |
| 4,877,680 | 10/1989 | Sakaki et al. | 428/332 |
| 4,956,223 | 9/1990 | Arai et al. | 428/212 |
| 4,965,612 | 10/1990 | Sakaki et al. | 346/1.1 |
| 5,041,328 | 8/1991 | Akiya et al. | 428/212 |
| 5,081,470 | 1/1992 | Kurabayashi et al. | 346/1.1 |
| 5,101,218 | 3/1992 | Sakaki et al. | 346/1.1 |
| 5,137,778 | 8/1992 | Nakatsugawa et al. | 428/330 |
| 5,182,175 | 1/1993 | Sakaki et al. | 428/537.5 |
| 5,246,774 | 9/1993 | Sakaki et al. | 428/323 |
| 5,275,846 | 1/1994 | Imai et al. | 427/362 |
| 5,362,558 | 11/1994 | Sakaki et al. | 428/323 |
| 5,670,242 | 9/1997 | Asano et al. | 428/212 |

FOREIGN PATENT DOCUMENTS

| | | |
|---|---|---|
| 634283A1 | 1/1995 | European Pat. Off. . |
| 54-59936 | 5/1979 | Japan . |
| 5-33298 | 2/1993 | Japan . |

OTHER PUBLICATIONS

Database WPI, (Derwent Publications, Ltd.) AN 93–089165 with respect to Japanese Patent Document No. JP–A–05 033 298 (Feb. 9, 1993).

Database WPI, (Derwent Publications, Ltd.) AN 92–295212 with respect to Japanese Patent Document No. JP–A–04 202 011 (Jul. 22, 1992).

*Primary Examiner*—Merrick Dixon

*Attorney, Agent, or Firm*—Fitzpatrick, Cella, Harper & Scinto

[57] ABSTRACT

A cast coated paper for ink jet recording is prepared by a process including the steps of: forming on a base paper an undercoating layer containing alumina having a bulk density of at most 0.2 g/cm$^3$ and an adhesive, applying onto the undercoating layer an overcoating liquid containing a resin to form a wet overcoating layer, and pressing the wet overcoating layer against a heated drum having a mirror-finished surface to dry the overcoating layer, thereby forming a cast-coating layer. The resultant cast coated paper shows not only good gloss and ink jet recording performances (inclusive of ink absorptivity and recorded image density), but also good weather-fastness of recorded images.

9 Claims, 2 Drawing Sheets

CAST COATED PAPER FOR INK JET RECORDING, PROCESS FOR PRODUCING THE PAPER AND INK JET RECORDING METHOD USING THE PAPER

This application is a division of U.S. Ser. No. 08/545,154 filed Oct. 19, 1995, now U.S. Pat. No. 5,741,584.

FIELD OF THE INVENTION AND RELATED ART

The present invention relates to a cast-coated paper for ink jet recording. More particularly, the present invention relates to a cast coated paper which has an excellent gloss in its as-produced state or before-printed state, is particularly suitable for ink jet recording (printing), and provides excellent preservability of recorded images. The present invention also relates to a process for producing the paper and an ink jet recording method using the paper.

In recent years, ink jet recording, as represented by recording by means of an ink jet printer, has been intensively used because of low noise, capability of high speed recording and facility of multi-color recording.

Conventional ink jet recording papers have typically included high-quality or wood-free papers designed to have a high ink absorptivity and coated papers having a surface coating of porous pigment. Such ink jet recording papers generally have a low surface gloss and have the feel of so-called mat paper or dull finish paper.

However, accompanying increasing demands on ink jet recording, such as higher speed recording, higher resolution of recorded image and full color image formation, there has been a demand for an ink jet recording paper having a high surface gloss and excellent appearance.

Currently known high-gloss papers include a high-gloss coated paper prepared by surface-coating the paper with a plate-shaped pigment, optionally followed by calendering, and a so-called cast coated paper prepared by pressing a wet-coated surface against a heated metal drum having a highly polished mirror-finished surface and drying the coated surface to copy the mirror-like surface of the drum.

Generally, this conventional cast coated paper has a higher surface gloss and a better surface smoothness compared with ordinary coated paper finished by super-calendering and shows excellent printing capabilities with a printing press. For this reason, the cast coated paper has been generally used for providing high-quality prints but still has several difficulties when used as a recording medium for ink jet recording.

More specifically, a conventional cast coated paper has been prepared to have a high gloss by copying a mirror-finished drum surface of a cast-coater with a film-forming substance, such as an adhesive, included together with a pigment in the coating layer composition. On the other hand, the film-forming substance is liable to deprive the coating layer of its porosity and noticeably lower the ink absorptivity or penetrability required in ink jet recording. In order to improve the ink absorptivity, it is important to form a porous cast-coating layer, and a reduction in amount of the film-forming substance is required for that purpose. The reduction of the film-forming substance, however, results in a lower gloss of the cast coated paper in its as-produced state.

Accordingly, it is very difficult simultaneously to satisfy both the surface gloss and the recording performances (printability) in ink jet recording of a cast coated paper.

SUMMARY OF THE INVENTION

Accordingly, it is an object of the present invention to provide a cast coated paper having an excellent surface gloss, a surface smoothness, and excellent ink jet recording performances in combination and also provides excellent preservability of recorded images thereon.

Another object of the present invention is to provide a process for producing such a cast coated paper.

A further object of the present invention is to provide an ink jet recording method using such a cast coated paper.

One aspect of the present invention, there is provides a cast coated paper for ink jet recording, comprising, in lamination:

a base paper, an undercoating layer comprising alumina having a bulk density of at most 0.2 g/cm$^3$, and a cast-coating layer comprising a resin.

According to another aspect of the present invention, there is provided a process for producing a cast coated paper for ink jet recording, comprising the steps of:

forming on a base paper an undercoating layer comprising alumina having a bulk density of at most 0.2 g/cm$^3$ and an adhesive, applying onto the undercoating layer an overcoating liquid comprising a resin to form a wet overcoating layer, and pressing the wet overcoating layer against a heated drum having a mirror-finished surface to dry the overcoating layer, thereby forming a cast-coating layer.

According to a further aspect of the present invention, there is provided an ink jet recording method, comprising: ejecting an aqueous ink through a minute orifice onto a cast coated paper as described above.

These and other objects, features and advantages of the present invention will become more apparent upon consideration of the following description of the preferred embodiments of the present invention in conjunction with the accompanying drawings.

DETAILED DESCRIPTION OF THE INVENTION

Figure 1:
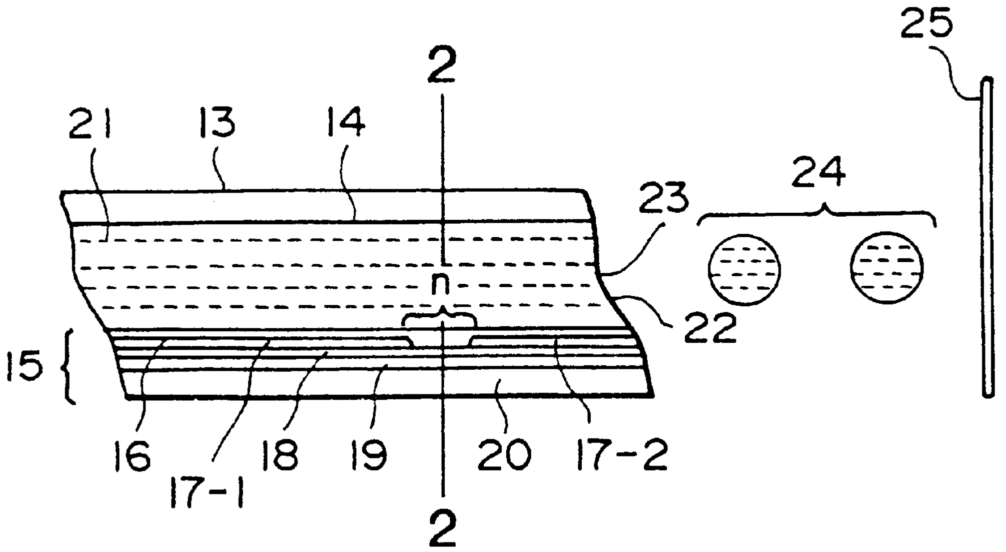
FIG. 1 is a longitudinal sectional view of a recording head of an ink jet recording device.

As described above, a principal feature of the cast coated paper according to the present invention is that it includes an undercoating layer containing alumina having a bulk density of at most 0.2 g/cm$^3$.

In the conventional ink jet recording materials, a silica-based pigment has been principally used in the ink absorbing layer in order to provide excellent ink receptivity, clarity of recorded image, high recorded image density, color generation performance and gradational image forming capability. However, such a silica-based pigment is liable to cause color change or discoloration when exposed to atmospheric oxygen or sunlight.

As a result of a study improvement in difficulties involved in conventional recording papers for ink jet recording as described above, it has been found effective to use a two-layered structure of ink-absorbing layers, use low-bulk density alumina having a low bulk density of at most 0.2 $g/cm^3$ as a pigment to be incorporated in a lower layer thereof (i.e., the undercoating layer) and form a cast-coating layer thereon as an upper layer. This structure is particularly effective in providing excellent preservability or storage stability of recorded images on the resultant cast coated paper and in providing excellent gloss and excellent image qualities. The lower limit of the bulk density of the alumina is not particularly limited but may preferably be 0.04 $g/cm^3$ or above. It is further preferred that the bulk density is in the range of 0.05–0.15 $g/cm^3$.

The bulk density used herein refers to a tap bulk density according to JIS H-1902 as measured generally in the following manner.

A sample powder is introduced at a rate of 20–60 g/min. into a dried mess cylinder having a volume of ca. 200 ml, a depth-to-inner diameter ratio of ca. 6:1 and a flat inner bottom through a funnel having an inner diameter of 100 mm, a conical root angle of 60 degrees, a leg length of 8 mm and a tip inner diameter of 6 mm with its leg tip positioned 10 mm above the top of the cylinder. After fully filling the cylinder with the sample powder, a piled-up portion of the sample powder is removed by sliding with a round glass bar so as not to impart a vibration to the cylinder.

Then, the cylinder just filled with the sample powder is dropped 100 times from a height of 3 cm onto a ca. 3 mm-thick rubber sheet placed on a rigid bench of concrete. Thus, the cylinder is snapped at its upper portion and vertically dropped from its bottom onto the sheet to compress the sample. After 100 times of dropping (tapping), the top of the sample powder in the cylinder is lightly pressed to be smooth, and a reference mark is given at the level on the cylinder. The cylinder in this state is weighed and designated $m_2$ (g). Then, the cylinder is emptied, then filled with water up to the reference line and weighed and designated $m_3$ (g). By using the net weight ($m_0$ (g)) of the cylinder, the tap bulk density $d_B$ ($g/cm^3$) is calculated (with an assumption that water has a density of ca. 1.0 $g/cm^3$) according to the following equation:

$$d_B=(m_2-m_0)/(m_3-m_0).$$

Alumina mostly has plate-like structure, but it is preferred to use flaky alumina particles because such flaky alumina can easily trap air between the particles.

Incidentally, ordinary commercially available alumina has a bulk density of 0.4 $g/cm^3$ or higher, and mostly has a bulk density of ca. 0.6–1.5 $g/cm^3$.

The reason why such a low-bulk density alumina provides advantageous effects has not been fully clarified as yet, but it is assumed that such low-bulk alumina provides a porous undercoating layer, giving an improved ink absorptivity.

As described above, the present invention is characterized by the use of such a low-bulk density alumina, and the process for production thereof is not particularly limited. However, hydrolysis of aluminum alkoxide as represented by the following scheme may be effective in providing high-purity alumina in fine particulate form.

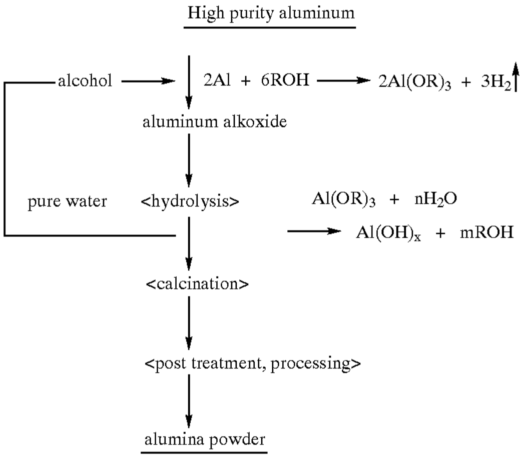

In the above-process, metallic aluminum is reacted with an alcohol, such as methanol, to form an alkoxide, which is then hydrolyzed to provide aluminum hydroxide. The aluminum hydroxide is then calcined to obtain powdery alumina.

The density of alumina may be controlled to a desired level by appropriately selecting the temperature and time for calcination, and selecting the starting alumina hydrate, etc., in combination.

Among such low-bulk density alumina, it is particularly preferred to use one having a BET specific surface area of at most 200 $m^2/g$. (The specific surface area values described herein are based on values obtained by nitrogen adsorption according to the BET one point method by using a direct reading specific surface area measuring equipment ("Monosorb" (trade name), available from QUANTA CHROME Co.). By using alumina satisfying this condition, it is possible to provide a further improved preservability (weatherability or weatherfastness) to recorded images obtained by ink jet recording.

The lower limit of the BET specific surface area need not be particularly limited but may preferably be 1.0 $m^2/g$ or higher. Too low a BET specific surface area is liable to result in a low ink absorptivity. Accordingly, the BET specific surface area may further preferably be 10.0 $m^2/g$ or higher, particularly preferably 100 $m^2/g$ or higher.

The BET specific surface area is affected by the shape of alumina primary particles and is not particularly correlated with the bulk density.

The alumina may preferably have an average primary particle size on the order of 0.01–1 $\mu m$ when observed through an electron microscope, but this is not required. Because of secondary agglomeration, the alumina may exhibit an average particle size on the order of 0.05–10 $\mu m$ when measured according to the sedimentation method. The particle size may vary depending on the dispersion conditions, such as slurry concentration, use or absence of a dispersion aid, a type of dispersing means, and the time elapsed after slurry formation. As a specific example, a commercially available flaky cationic alumina ("AKP-G015", available from Sumitomo Kagaku Kogyo K.K.; primary particle size=at most 0.1 $\mu m$) provided an average particle size of ca. 2 $\mu m$ when dispersed at a concentration of 0.8 wt. % in a 0.2 wt. % aqueous solution of sodium hexametaphosphate after 10 min. of ultrasonic dispersion, and ca. 0.5 $\mu m$ when dispersed in a high dispersion-type sand mill.

The alumina may preferably constitute 50–100 wt. % of the total pigment contained in the undercoating layer. Other pigments ordinarily used in the field of coated paper production may also be used, including kaolin, clay, calcined kaolin, amorphous silica, zinc oxide, aluminum hydroxide, calcium carbonate, satin white, aluminum silicate, magnesium silicate, magnesium carbonate, and plastic pigment.

The specific alumina used in the present invention is contained particularly as an essential constituent in the undercoating layer partly because the inclusion thereof in a large amount in the cast-coating layer is liable to lower the ink color generating performance and to lower the surface gloss of the resultant cast coated paper.

In the undercoating layer, the alumina is used in combination with an adhesive, examples of which may include: known adhesives used for ordinary coated papers, including proteins, such as casein, soybean protein and synthetic protein; starches, such as starch and oxidized starch; polyvinyl alcohol; cellulose derivatives, such as carboxymethyl cellulose and methyl cellulose; conjugated diene-based polymers, such as styrene-butadiene copolymer, and methyl methacrylate-butadiene copolymer, acrylic polymers, and vinyl polymers, such as ethylene-vinyl acetate copolymer. Some of these polymers may be provided in the form of a latex. These adhesives may be used singly or in combination. The adhesive may be used in a proportion of 5–50 wt. parts, preferably 10–30 wt. parts, per 100 wt. parts of the pigment.

In the present invention, it is possible to add a cationic resin in a coating layer of a coated paper for ink jet recording in order to improve the moisture resistance and the image density of the recorded images. Particularly, the undercoating layer of the cast coated paper of the present invention can further contain such a cationic resin, including polyalkylenepolyamines such as polyethylenepolyamine and polypropylenepolyamine, and their derivatives; acrylic resins having a tertiary amine group or a quaternary ammonium group; and diacrylamine. It is also possible to use two or more species of resin in combination.

The cationic resin may be added in a proportion of 1–30 wt. parts, preferably 5–20 wt. parts, per 100 wt. parts of the pigment, although it is not particularly restricted. Further, it is also possible to add optional additives, such as a dispersing agent, a thickening agent, a defoaming agent, a colorant, an antistatic agent and an antiseptic, as desired, as used in the production of ordinary coated papers.

The undercoating composition including the above components may be generally formulated as an aqueous coating liquid, or an aqueous coating composition, having a solid concentration of ca. 1–65 wt. % and applied at a dry coating rate of ca. 2–50 g/m$^2$, preferably ca. 5–20 g/m$^2$, onto a base paper having a basis weight of ca. 20–400 g/m$^2$. The undercoating may be applied by known coating means, such as a blade coater, an air knife coater, a roll coater, a brush coater, a Champflex coater, a bar coater, or a gravure coater. After drying, the undercoating layer can be further subjected to a smoothing treatment, such as super-calendering, brushing, or cast-finishing, as desired.

The base paper is not particularly limited with respect to its material but may ordinarily be acidic paper or neutral paper generally used in ordinary coated paper, selectively used as desired.

The thus-formed undercoating layer containing alumina having a bulk density of at most 0.2 g/cm$^3$ is coated with a cast-coating layer containing a resin which may for example be a polymer of an ethylenically unsaturated monomer, i.e., a monomer having an ethylenically unsaturated bond.

Examples of the ethylenically unsaturated monomer giving the polymer contained in the cast-coating layer include: acrylates having a $C_1$–$C_{18}$ alkyl group, such as methyl acrylate, ethyl acrylate, butyl acrylate, 2-ethylhexyl acrylate, lauryl acrylate, 2-hydroxyethyl acrylate, and glycidyl acrylate; methacrylates having a $C_1$–$C_{18}$ alkyl group, such as methyl methacrylate, ethyl methacrylate, 2-hydroxyethyl methacrylate, 2-hydroxypropyl methacrylate, and glycidyl methacrylate; and other ethylenically unsaturate monomers, such as styrene, α-methylstyrene, vinyltoluene, acrylonitrile, vinyl chloride, vinylidene chloride, vinyl acetate, vinyl propionate, acrylamide, N-methylolacrylamide, ethylene and butadiene.

The polymer can be a copolymer of two or more ethylenically unsaturated monomers. Further, these polymers or copolymers can be used in the form of a substitution derivative, examples of which may include: carboxylation and conversion into an alkali-reactive form of the carboxylated derivative. Further, such a polymer or copolymer can be included in the cast-coating layer in a composite form, e.g., a composite with colloidal silica connected via Si—O—R bond (wherein R represents a polymer component) formed by polymerizing an ethylenically unsaturated monomer in the presence of colloidal silica. Further, it is also possible to add a pigment, such as colloidal silica, as long as the pigment does not adversely affect the surface gloss or the recording characteristic, e.g., in a proportion of at most 200 wt. parts per 100 wt. parts of the polymer in the cast-coating layer. Colloidal silica may have an average particle size of ca. 0.01–0.2 μm, although it is not restrictive.

The polymer (resin) contained in the cast-coating layer may preferably have a glass transition point of at least 40° C., more preferably ca. 50–100° C.

More specifically, in a process for production of a conventional cast coated paper, a cast-coating layer is provided with an excellent surface gloss by allowing the resin (polymer) in the cast-coating composition to fully form a film during the cast finishing. According to such a conventional process, however, the resultant cast-coating layer is liable to have a reduced porosity and therefore a lower ink absorptivity at the time of ink jet recording, so that it is difficult to obtain cast coated paper with desirable ink jet recording performances in many cases.

Accordingly, in order to provide better ink absorptivity, it is preferred to use a polymer having a relatively high glass transition point and effect the cast finishing under a condition which does not allow a sufficient film formation of the polymer. As a result, it is possible to produce a cast coated paper with excellent surface gloss while effectively retaining a surface porosity which has excellent ink absorptivity.

On the other hand, if the polymer has a low glass transition point, the polymer is liable to cause excessive film formation by the heat of the casting drum surface, thus being liable to provide a cast-coating layer having a reduced surface porosity leading to a lower ink absorptivity, while the paper may have a high surface gloss.

For this reason, in the process for producing a cast coated paper according to the present invention, it is further preferred to dry-finish the cast-coating layer at a temperature below the glass transition point of the resin contained therein.

In order to control the whiteness, viscosity, fluidity, etc., the cast-coating composition can additionally contain various additives as used in ordinary coated paper for printing or ink jet recording paper, such as pigments, dispersing agents, thickening agents, defoaming agents, colorants, anti-static agents, and antiseptics, as desired.

The thus-prepared undercoated paper is further coated with the cast-coating liquid containing the above-mentioned polymer by a known coating device, such as a blade coater, an air knife coater, a roll coater, a brush coater, a Champflex coater, a bar coater or a gravure coater, to form a wet overcoating layer. Then, the overcoating layer, while in a wet state, is pressed against a heated, mirror-finished drum to be dry-finished. The resultant overcoating or cast-coating layer may be formed at a dry coating rate of 0.2–30 $g/m^2$, preferably 1–10 $g/m^2$.

In a preferred embodiment of the present invention, the cast coated paper may be controlled to have an air permeability of at most 300 sec/100 cc as measured according to JIS-P-8117 so as to provide excellent ink absorptivity.

The lower limit of the air permeability is not particularly limited, but an air permeability of at least 5 sec/100 cc, particularly 10–200 sec/100 cc, is preferred.

As a measure for providing a cast coated paper having an air permeability according to JIS-P-8117 of at most 300 sec/100 cc as described above, it is preferred that the base paper after being provided with an undercoating layer is controlled to have a Gurley air permeability (i.e., an air permeability measured by using a Gurley high pressure-type air permeability tester according to ASTM-D-726, B method) of at most 30 sec/10 cc. A lower Gurley air permeability value means a good permeability or smaller resistance to air passage through a sample similar to the air permeability value according to JIS-P-8117.

The thus-prepared cast coated paper or gloss paper may be used in the ink jet recording method according to the present invention, wherein ink is released or ejected from a nozzle or orifice onto the paper as an objective recording medium according to any effective scheme. A particularly effective example of such an ink jet recording scheme may be one as disclosed in Japanese Laid-Open Patent Application (JP-A) 54-59936, wherein ink is supplied with thermal energy to cause an abrupt volume change and is ejected out of a nozzle due to the volume change.

Figure 2:
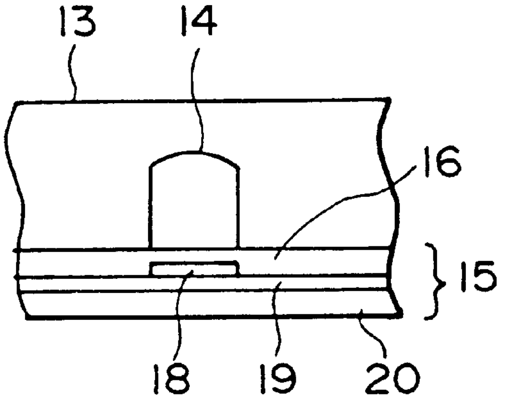
FIG. 2 is a cross-sectional view taken along line 2—2 shown in FIG. 1.
Figure 3:
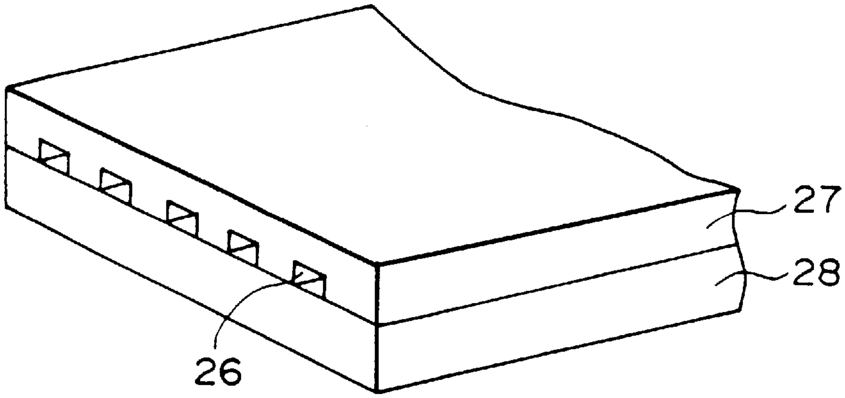
FIG. 3 is a partial perspective view of a multiple recording head including the head shown in FIGS. 1 and 2.
Figure 4:
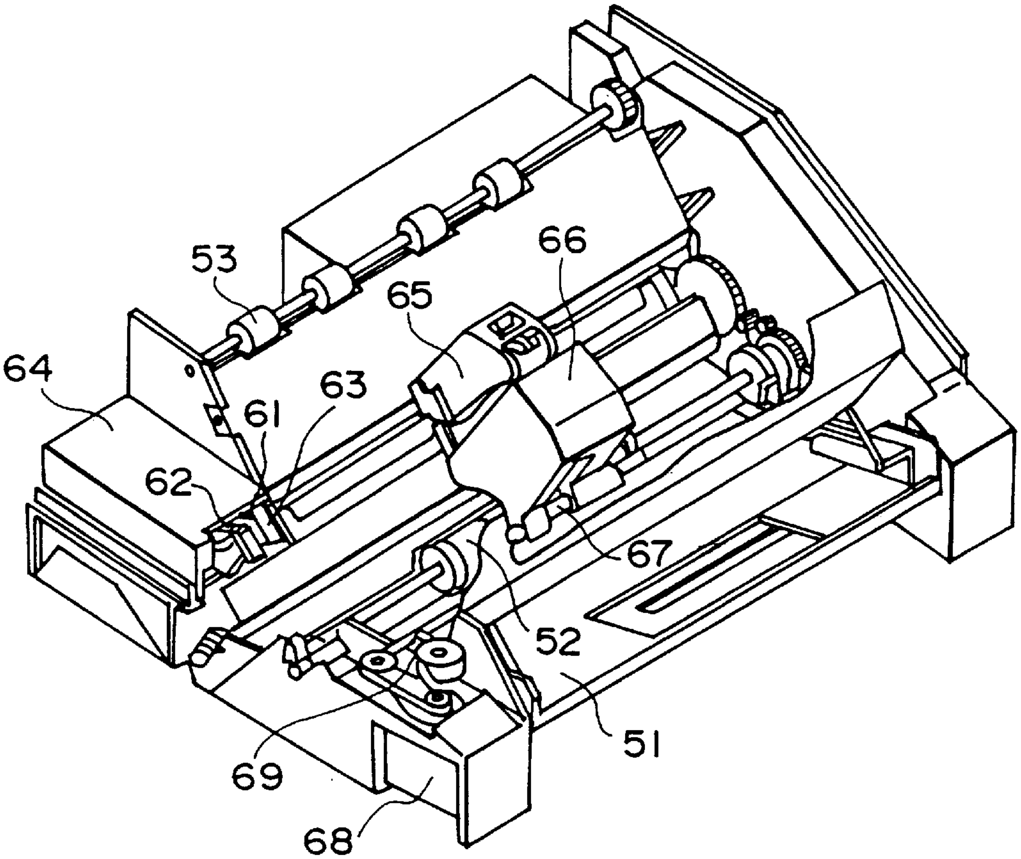
FIG. 4 is perspective view of an example of an ink jet recording apparatus.

The following section describes a recording apparatus which is suitably used in the ink jet recording method based on FIGS. 1–3 showing structure of an ink ejection nozzle head and FIG. 4 showing the entire structure of the apparatus, including the head.

FIG. 1 is a sectional view of a head 13 along an ink passage. FIG. 2 is a sectional view taken along the line 2—2 of FIG. 1. Referring to FIGS. 1 and 2, a head 13 is obtained by bonding a glass, ceramic or plastic plate having a groove 14 which forms an ink passage to a heat generating head 15 (although a head is shown as a heat generating means in the figure, it is not limitative), having a heat generating resistive member, for use in thermal recording. The heat generating head 15 is composed of a protective film 16 formed of silicon oxide, aluminum electrodes 17-1 and 17-2, a heat-generating resistive layer 18 formed of nichrome or the like, a heat storage layer 19, and a substrate 20 having good heat dissipating property, such as alumina.

Recording ink 21 reaches a discharge orifice (micropore) 22, and forms a meniscus 23 by a pressure. At this point, when an electrical signal is applied to the aluminum electrodes 17-1 and 17-2, the region indicated by n of the heat generating head 15 suddenly generates heat; air bubbles are generated in the ink 21 in contact with this region; the meniscus is discharged by that pressure; the droplets are formed into recording droplets 24 through the orifice 22, and jetted toward a recording member 25. FIG. 3 is a schematic perspective view of a recording head in which a number of nozzles shown in FIGS. 1 and 2 are arranged. The recording head is manufactured by bringing a glass sheet 27 having a number of passages 26 into close contact with a heat generating head 28 having the same construction as that explained with reference to FIG. 1.

FIG. 4 illustrates an example of an ink jet recording apparatus into which the head is incorporated.

In FIG. 4, reference numeral 61 denotes a blade serving as a wiping member, one end of which is held by a blade holding member and formed into a fixed end, forming a cantilever. The blade 61 is arranged at a position adjacent to the recording region by the recording head. In this example, the blade 61 is held in a position such that it projects into the path of movement of the recording head. Reference numeral 62 denotes a cap which is disposed at a home position adjacent to the blade 61 and is moved in a direction perpendicular to the direction in which the recording head is moved. The cap 62 is and brought into contact with the surface of the discharge port so that capping is performed. Reference numeral 63 denotes an ink absorber disposed adjacent to the blade 61, and is held in such a manner as to protrude into the movement passage of the recording head in the same manner as the blade 61. The blade 61, the cap 62 and the ink absorber 63 constitute a discharge recovery section 64. Water, dust or the like is removed to the ink discharge port surface by means of the blade 61 and the absorber 63.

Reference numeral 65 denotes a recording head, having a discharge energy generating means, for performing recording by discharging ink onto a recording member facing the discharge port surface where the discharge port is arranged; and reference numeral 66 denotes a carriage having the recording head 65 installed therein, by which the recording head 65 is moved. The carriage 66 engages pivotally with a guide shaft 67, and a part of the carriage 66 is connected to a belt 69 (in a manner not shown) which is driven by a motor 68. As a result, the carriage 66 is allowed to move along the guide shaft 67 and move in the region of recording by the recording head 65 and the region adjacent thereto.

Reference numeral 51 denotes a paper feeding part for inserting recording papers, and reference numeral 52 denotes a paper feeding roller which is driven by a roller (not shown). This arrangement allows the recording paper to be fed to a position opposite the ejection outlet of the recording head and to be delivered to a take-off part having a take-off roller 53 as the recording proceeds.

In the above-mentioned arrangement, when the recording head 65 is returned to the home position at the end of recording, the cap 62 in the head recovery part 64 is retracted from the movement path of the recording head 65, while the blade 61 is projected into the movement path. As a result, the ejection outlet surface of the recording head is wiped by the blade 61. When the cap 62 contacts the ejection outlet surface of the recording head so as to cap it, the cap 62 is moved so as to project into the movement path of the recording head 65.

When the recording head 65 is moved from the home position to the recording start position, the cap 62 and the blade 61 are at the same positions as in the wiping operation. As a result, the ejection outlet surface of the recording head 65 is also wiped during the movement thereof.

The recording head 65 is moved to the home position adjacent to the recording region not only at the end of recording and recovery of discharging (the operation of sucking ink from the ejection outlet in order to recover the normal discharge of an ink from the ejection outlet), but also at predetermined intervals when it is moved in the recording region for recording. This movement also causes the above-described wiping.

The ink used in the ink jet recording method of the present invention comprises, as essential components, a colorant for forming images and a liquid medium for dissolving or dispersing the colorant therein. The ink and may further contain optional additives, such as dispersing agent, surfactant, viscosity modifier, electric resistivity-adjusting agent, pH-adjusting agent, antiseptic, and colorant-dissolution or -dispersion stabilizer, as desired.

The colorant or recording agent used in the ink may comprise direct dye, acid dye, basic dye, reactive dye, food dye, disperse dye, oil dye or various pigment, but any known colorants can be used without particular restriction. The colorant may be contained in a quantity determined depending on the liquid medium used and the properties required of the ink but may be used in a conventional proportion, i.e., ca. 0.1–20 wt. %, without particular problem.

The alumina having a specific bulk density used in the present invention may preferably be cationic. In this case, in view of the cationic nature of the alumina, it is particularly preferred to use direct dye or acid dye so as to provide good color-generating performance and preservability of recorded images.

The ink used in the present invention comprises a liquid medium for dissolving or dispersing the colorant therein. The liquid medium may comprise water or a mixture of water and a water-miscible organic solvent, such as a polyhydric alcohol capable of preventing the drying of the ink.

In the case of using color inks, including those of yellow, cyan and magenta, for example, those color inks may preferably have a surface tension of 25–40 dyne/cm, so as to suppress the blurring of inks between different colors.

EXAMPLES

The present invention is described more specifically in the following Examples. However, these Examples should not be construed as limiting. In the Examples, "%" and "parts" are by weight unless otherwise noted specifically. Unless otherwise noted specifically, the term "part(s)" is used to express weight ratios among the components except for water.

Example 1

An aqueous undercoating liquid having a solid content of 15% was prepared by using 100 parts of high-purity flaky alumina (pigment "AKP-G015" (trade name) available from Sumitomo Kagaku Kogyo K.K.; $d_B$ (bulk density)=0.07 g/cm$^3$, $S_{BET}$ (BET specific surface area)=150 m$^2$/g), 15 parts of polyvinyl alcohol (adhesive), 8 parts of polyethylenepolyamine-based resin, 10 parts of a condensation product between dicyandiamide and formalin (cationic resin; "NEOFIX FY" (trade name), available from Nikka Kagaku Kogyo K.K.) and 0.5 part of sodium polyphosphate (dispersing agent). The undercoating liquid was applied at a dry coating rate of 8 g/m$^2$ by an air knife coater onto a base paper having a basis weight of 100 g/m$^2$, followed by drying to prepare an undercoated base paper (i.e., a base paper provided with an undercoating layer).

On the other hand, an aqueous cast-coating liquid having a solid content of 30% was prepared by using 40 parts of styrene-2-methylhexyl acrylate copolymer having a glass transition point (Tg) of 80° C., 60 parts of colloidal silica and 2 parts of calcium stearate (release agent). The cast-coating liquid was applied by a roll coater onto the undercoated base paper to form a wet overcoating or cast-coating layer, which was immediately thereafter pressed against a mirror-finished drum having a surface temperature of 85° C. to be dried, followed by releasing, to form a cast coated paper for ink jet recording. The cast-coating rate (solid) was 7 g/m$^2$.

Example 2

A cast coated paper for ink jet recording was prepared in the same manner as in Example 1 except that the surface temperature of the mirror-finished drum was changed from 85° C. to 70° C. The cast-coating rate (solid) was 7 g/m$^2$.

Example 3

A cast-coating liquid having a solid content of 35% was prepared by using 100 parts of styrene-methyl acrylate copolymer (Tg=50° C.) and 5 parts of ammonium oleate (release agent). The cast-coating liquid was applied by a roll coater onto an undercoated base paper identical to the one prepared in Example 1 to form a wet cast-coating layer, which was immediately thereafter pressed against a mirror-finished drum having a surface temperature of 60° C. to be dried, followed by releasing, to obtain a cast coated paper for ink jet recording. The cast-coating rate (solid) was 3 g/m$^2$.

Example 4

A cast-coating liquid having a solid content of 40% was prepared by using 100 parts of styrene-methyl acrylate copolymer (Tg=70° C.)/colloidal silica composite (weight ratio=50/50) and 3 parts of ammonium oleate (release agent). The cast-coating liquid was applied by a roll coater onto an undercoated base paper identical to the one prepared in Example 1 to form a wet cast-coating layer, which was immediately thereafter pressed against a mirror-finished drum having a surface temperature of 65° C. to be dried, followed by releasing, to obtain a cast coated paper for ink jet recording. The cast-coating rate (solid) was 6 g/m$^2$.

Example 5

An undercoating liquid having a solid content of 15% was prepared by using 90 parts of high-purity flaky alumina (pigment; "AKP-G030" (trade name), available from Sumitomo Kagaku Kogyo K.K.; $d_B$=0.07 g/cm$^3$, $S_{BET}$=250 m$^2$/g), 10 parts of amorphous silica (pigment), 15 parts of polyvinyl alcohol (adhesive), 8 parts of polyethylenepolyamine-based resin (cationic agent), 10 parts of a condensation product between dicyandiamide and formalin (cationic resin; "NEOFIX FY" (trade name), available from Nikka Kagaku Kogyo K.K.), and 0.5 part of sodium polyphosphate (dispersing agent). The undercoating liquid was applied at a dry coating rate of 8 g/cm$^2$ by an air knife coater onto a base paper having a basis weight of 100 g/m$^2$, followed by drying, to obtain an undercoated base paper.

A cast-coating liquid identical to the one used in Example 1 was applied onto the above undercoated base paper, followed by drying, in the same manner as in Example 1 to prepare a cast coated paper for ink jet recording. The cast-coating rate (solid) was 7 g/m$^2$.

Example 6

A cast coated paper for ink jet recording was prepared in the same manner as in Example 1 except for replacing the high-purity flaky alumina (pigment; "AKP-G015" (trade name), available from Sumitomo Kagaku Kogyo K.K.; $d_B$=0.07 g/cm$^3$, $S_{BET}$=150 m$^2$/g) in the undercoating liquid with 100 parts of high-purity plate-shaped alumina (pigment; "AKP-G" (trade name), available from Sumitomo Kagaku Kogyo K.K.; $d_B$=0.18 g/cm$^3$, $S_{BET}$=150 m$^2$/g).

Comparative Example 1

An undercoating liquid having a solid content of 30% was prepared by using 70 parts of $MgCo_3$ (pigment; $d_B$=0.26 g/cm$^3$, $S_{BET}$=50 m$^2$/g), 30 parts of ground heavy calcium carbonate (pigment: $d_B$=1.1 g/cm$^3$, $S_{BET}$=3.0 m$^2$/g), 5 parts of oxidized starch (adhesive), 10 parts of styrene-butadiene copolymer latex (adhesive), 5 parts of condensation product between dicyandiamide and formalin (cationic polymer; "NEOFIX FY" (trade name), available from Nikka Kagaku Kogyo K.K.), and 0.4 part of sodium polyphosphate (dispersing agent). The undercoating liquid was applied at a dry coating rate of 15 g/m$^2$ by a blade coater onto a base paper having a basis weight of 100 g/m$^2$, followed by drying, to obtain an undercoated paper.

A cast-coating liquid identical to the one used in Example 1 was applied onto the above undercoated base paper, followed by drying, in the same manner as in Example 1 to prepare a cast coated paper for ink jet recording. The cast-coating rate (solid) was 6 g/m$^2$.

Comparative Example 2

An undercoating liquid having a solid content of 20% was prepared by using 100 parts of high-purity plate-shaped alumina (pigment; "AKS-G" (trade name), available from Sumitomo Kagaku Kogyo K.K.; $d_B$=0.4 g/cm$^3$, $S_{BET}$=150 m$^2$/g), 15 parts of polyvinyl alcohol (adhesive), 8 parts of polyethylenepolyamide-based resin (cationic polymer; "NEOFIX RP-70" (trade name), available from Nikka Kagaku Kogyo K.K.), and 0.4 part of sodium polyphosphate (dispersing agent). The undercoating liquid was applied at a dry coating rate of 7 g/m$^2$ by an air knife coater onto a base paper having a basis weight of 80 g/m$^2$, followed by drying, to obtain an undercoated paper.

A cast-coating liquid identical to the one used in Example 1 was applied onto the above undercoated base paper, followed by drying, in the same manner as in Example 1 to prepare a cast coated paper for ink jet recording. The cast-coating rate (solid) was 7 g/m$^2$.

Comparative Example 3

An undercoating liquid having a solid content of 30% was prepared by using 100 parts of amorphous silica (pigment; $d_B$=0.05 g/cm$^3$, $S_{BET}$=250 m$^2$/g), 15 parts of polyvinyl alcohol (adhesive), 8 parts of diacrylamine acrylamide-based resin (cationic polymer; "SUMIREZ RESIN 1001" (trade name), available from Sumitomo Kagaku Kogyo K.K.), and 0.4 part of sodium polyphosphate (dispersing agent). The undercoating liquid was applied at a dry coating rate of 6 g/m$^2$ by a blade coater onto a base paper having a basis weight of 80 g/m$^2$, followed by drying, to obtain an undercoated paper.

A cast-coating liquid identical to the one used in Example 1 was applied onto the above undercoated base paper, followed by drying, in the same manner as in Example 1 to prepare a cast coated paper for ink jet recording. The cast-coating rate (solid) was 5 g/m$^2$.

Comparative Example 4

A cast coated paper for ink jet recording was prepared in the same manner as in Comparative Example 2 except for replacing 100 parts of the high-purity plate-shaped alumina ("AKS-G") in the undercoating liquid with 100 parts of high-purity plate-shaped alumina ("AKP-3000" (trade name), available from Sumitomo Kagaku Kogyo K.K.; $d_B$: 0.7 g/cm$^3$, $S_{BET}$=6 m$^2$/g).

Comparative Example 5

A cast coated paper for ink jet recording was prepared in the same manner as in Comparative Example 2 except for replacing 100 parts of the high-purity plate-shaped alumina ("AKS-G") in the undercoating liquid with 100 parts of plate-shaped alumina obtained from aluminum hydroxide formed by treating bauxite with hot caustic soda ("A-11" (trade name), available from Sumitomo Kagaku Kogyo K.K.; $d_B$: 1.1 g/cm$^3$, $S_{BET}$=150 m$^2$/g).

Comparative Example 6

An undercoating liquid having a solid content of 50% was prepared by using 50 parts of kaolin (pigment; $d_B$=0.85 g/cm$^3$, $S_{BET}$=20 m$^2$/g), 50 parts of precipitated calcium carbonate (pigment: $d_B$=0.8 g/cm$^3$, $S_{BET}$=11.5 m$^2$/g), 5 parts of oxidized starch (adhesive), 20 parts of styrene-butadiene copolymer latex (adhesive), and 0.5 part of sodium polyphosphate (dispersing agent). The undercoating liquid was applied at a dry coating rate of 12 g/m$^2$ by an air knife coater onto a base paper having a basis weight of 100 g/m$^2$, followed by drying, to obtain an undercoated paper.

Separately, a cast-coating liquid having a solid content of 45% was prepared by using 100 parts of kaolin, 10 parts of casein, 10 parts of styrene-methyl methacrylate copolymer (Tg=30° C.) and 10 parts of calcium stearate (release agent), and applied by a roll coater onto the above-prepared under-coated base paper to form a wet coating layer, which was then immediately pressed against a mirror-finished drum having a surface temperature of 85° C. to be dried, followed by releasing, to obtain a cast coated paper for ink jet recording. The cast-coating rate (solid) was 12 g/m$^2$.

The gloss (in as-produced state), ink jet recording performances (inclusive of ink absorptivity and recorded image density) and the weather fastness of the above-prepared cast coated papers were evaluated in the following manner and are shown in Table 1 below.

Gloss

Measured according to JIS-P8142.

Ink Absorptivity For Ink Jet Recording Inks

Recording was performed on each cast coated paper by using a commercially available bubble jet-type ink jet printer ("BJC600", mfd. by Canon K.K.) incorporating three color inks of yellow, cyan and magenta respectively comprising a direct dye and having a surface tension of 35 dyne/cm. The dryness of the recorded ink images was evaluated by eyes according to the following standards.

- AA: Ink was absorbed immediately (within 1 sec.) after the recording. Clear boundary was recognized between a recorded portion of green (mixture of magenta and cyan) and a recorded portion of red (mixture of yellow and magenta).
- A: Ink was absorbed within 5 sec. Clear boundary was recognized between green and red recorded portions.
- B: Ink absorption was somewhat slow. Somewhat unclear boundary between green and red recorded portions.
- C: Ink absorption was slow. Unclear boundary was observed between green and red recorded portions, and somewhat unclear boundary was recognized between recorded portions of magenta, cyan and yellow.

Recorded Image Density

After a recording similar to the above recording, the image density of the recorded images was evaluated by visual observation of the following standards so as to evaluate a clarity during the color recording.

- A: Excellent image density.
- B: The image density was somewhat inferior.

Weather-fastness

The recorded images obtained above were left standing at room temperature for 3 months and lowering in image density was evaluated by visual observation according to the following standards:

A: No lowering in image density. Excellent.

B: A lowering in image density was recognizable.

C: A conspicuous lowering in image density.

TABLE 1

| | | Recording performances | | | |
|---|---|---|---|---|---|
| | | Gloss (%) | Ink absorptivity | Image density | Weather-fastness |
| Example | 1 | 86 | A | A | A |
| | 2 | 85 | AA | A | A |
| | 3 | 85 | A | A | A |
| | 4 | 85 | AA | A | A |
| | 5 | 87 | A | A | B |
| | 6 | 84 | B | A | A |
| Comp. Example | 1 | 88 | C | B | A |
| | 2 | 75 | B | B | A |
| | 3 | 85 | AA | A | C |
| | 4 | 75 | C | B | A |
| | 5 | 85 | B | B | A |
| | 6 | 89 | C | B | A |

As is understood from the results shown in Table 1 above, the cast coated papers according to the present invention were excellent in all of surface gloss, ink jet recording performances (inclusive of ink absorptivity and recorded image density) and weather-fastness of recorded images. Further, the productivity of the cast coated papers was also found to be excellent.

What is claimed is:

1. A process for producing a cast coated paper for ink jet recording, comprising the steps of:

forming on a base paper an undercoating layer comprising alumina having a bulk density of 0.05 to 0.15 g/cm$^3$ and an adhesive, applying onto the undercoating layer an overcoating liquid comprising a resin to form a wet overcoating layer, and pressing the wet overcoating layer against a heated drum having a mirror-finished surface to dry the overcoating layer, thereby forming a cast-coating layer.

2. A process according to claim 1, wherein said alumina has a BET specific surface area of at most 200 m$^2$/g.

3. A process according to claim 1, wherein said resin contained in the overcoating liquid for the cast-coating layer comprises a polymer having a glass transition point of at least 40° C.

4. A process according to claim 3, wherein said polymer is a polymer or copolymer of an ethylenically unsaturated monomer.

5. A process according to claim 1, wherein said alumina has an average particle size of from 0.05 to 10 $\mu$m.

6. A process according to claim 1, wherein said alumina has an average primary particle size of 0.01–1 $\mu$m.

7. A process according to claim 1, wherein said cast-coating layer further comprises a colloidal silica in an amount of at most 200 parts by weight per 100 parts by weight of said resin.

8. A process according to claim 1, wherein said alumina is high-purity alumina.

9. A process according to claim 8, wherein said high-purity alumina has been obtained through a process including the steps of hydrolyzing alumina alkoxide to alumina hydroxide and calcining the alumina hydroxide to form powdery alumina.

* * * * *

UNITED STATES PATENT AND TRADEMARK OFFICE

CERTIFICATE OF CORRECTION

PATENT NO. : 6,096,157
DATED : August 1, 2000
INVENTOR(S) : Katsuyoshi Imabeppu et al.

It is certified that error appears in the above-identified patent and that said Letters Patent is hereby corrected as shown below:

<u>Column 2,</u>
Line 8, “invention, there is” should read -- invention --.
Line 64, “improvement in” should read -- aimed at resolving the --.

<u>Column 12,</u>
Line 43, “eyes” should read -- visual observation --.

Signed and Sealed this

Twenty-fifth Day of May, 2004

JON W. DUDAS
*Acting Director of the United States Patent and Trademark Office*